Patented Dec. 18, 1945

2,391,293

UNITED STATES PATENT OFFICE 2,391,293

TERPENE RESINS

William H. Carmody, Springfield, Ohio, assignor to Pennsylvania Industrial Chemical Corporation, Clairton, Pa., a corporation of Pennsylvania No Drawing. Application August 4, 1942,
Serial No. 453,557

3 Claims. (Cl. 260—80)

This invention relates to production of resin from the pinene of turpentine and other polymerizable terpene substances. The application herein is a continuation-in-part of my co-pending application Serial No. 258,226, filed February 24, 1939.

The object of the invention is to obtain an increased yield of solid resin from terpene materials, which resin is light in color, clear and substantially non-yellowing, and of good solubility in the various hydrocarbon solvents and common varnish oils. It is further an object of my invention to provide a simple and easily practiced procedure for so doing.

It has been previous experience in the art that the use of metallic halide catalysts in the polymerization of terpene substances results in the production of a relatively great quantity of dipolymer oil (i. e., an oily material preponderantly composed of terpene dimers) with a relatively small inclusion of those higher polymers which constitute solid resin. If a very vigorous catalyst such as sulphuric acid, was employed, the resultant polymerized product has been dark in color, and the yield of solid resin, while greater than when a metallic halide catalyst was used, has not been high unless the reaction temperature was rigidly controlled.

I have discovered that by means of a polymerization process stimulated by a metallic halide catalyst, and continued for a relatively long reaction period under conditions to give a good reaction value, I am able to obtain a high yield of polymerized terpene product containing a high proportion of solid resin. I also have discovered that the mere use of a metallic halide catalyst serves to give a terpene resin of light color, and one which is not highly susceptible to after-yellowing. I have discovered that in prior practice, workers in the art have imposed upon processes utilizing a metallic halide catalyst the conditions necessarily used in polymerizing terpenes with sulphuric acid, and similarly vigorous catalysts, thus failing to discover and take advantage of the characteristics inherent in the metallic halide catalysts in producing desirable resin from terpene starting materials.

Thus, I have found that the metallic halide catalysts being relatively less vigorous than sulphuric acid, do not in their use require the employment of any substantial volume of diluent to control the temperature rise resultant from the exothermic polymerization reaction; and that the volume of diluent may be, and should be minimized, or diluent wholly omitted. This is the case because of my observation that dilution of the terpene starting material tends, in a polymerization process stimulated by a metallic halide catalyst, to decrease the proportional formation of those polymers which constitute solid resin. Also I have found that within reasonable working limits, temperature need not be rigidly limited throughout the entire polymerization reaction, but that a relatively high working temperature is permissible without detriment to the color of the resin produced; and have found that relatively complicated recovery steps involving the use of reagents to precipitate the metallic halide catalyst are unnecessary, and in measure disadvantageous.

My process, fundamentally considered, consists in subjecting terpene substances in concentrated condition to the catalytic effect of an adequate quantity of a metallic halide catalyst, and in allowing such time for the progress of the polymerization reaction that it may proceed approximately to the maximum extent possible with a catalyst of that sort. This is based upon the fact that in the polymerization of terpene substances the first reaction surge is followed by a long-continued secondary reaction which, if given opportunity to proceed, tends to increase greatly the proportion of the polymers which form solid resin.

Broadly considered, I may employ as a catalyst any anhydrous metallic halide of the Friedel-Crafts type, such as the halides of tin, aluminum, iron, zinc, antimony, titanium, and indium, boron, and so forth. From practical considerations I prefer to use aluminum chloride, or boron fluoride, as these catalysts are commercially available and economical, and serve effectively to promote the polymerization reaction.

In speaking of primary and secondary reaction periods, I designate as the primary reaction period the one in which the catalyst is from time to time added, and in which a temperature surge occurs, and by secondary reaction period intend to designate the length of time in which the reaction is permitted to proceed after the entire charge of catalyst has been added. The total time allowed for polymerization will vary generally in inverse relation to the quantity of heat evolved, and removed, per unit volume of starting material.

Turpentine provides at present the best commercial source of supply of polymerizable terpene unsaturates. Terpenes which occur in turpentine and related materials, include alpha-pinene, beta-pinene, dipentene, sylvestrene, limonene, terpinene, terpinolene, phellandrene, menthene and borylene. American turpentine while potentially containing any of such substances in varying proportion, contains preponderantly alpha-pinene.

The invention may be here illustrated by giving examples, and discussing the factors involved in them and in related exemplary procedure under my invention. The following examples are given as exemplary of the principles involved:

Example No. 1

Taking 1000 parts by weight of turpentine, which consisted to the extent of about 85% its weight of terpene unsaturates, I placed the turpentine in a polymerizing vessel provided with channels for the circulation of cooling fluid, and organized for vigorous agitation of its contents. Agitation of the starting material was begun, and after agitation had continued for a short time, I began the addition of the polymerization catalyst, which was anhydrous aluminum chloride. This catalyst was added in small quantities over a period of about three hours, in a total of 50 parts by weight. During this period of gradual catalyst addition, the working material was vigorously agitated, and the temperature of the strongly exothermic polymerization reaction in the material was held at about 20° C. to 25° C. by circulation of brine throughout the cooling channels of the polymerizing vessel. If a sample of the working material be taken at the end of this period in which the catalyst is added, such sample may be treated in the following manner, and the effect of the polymerization reaction at that stage may be noted.

Assuming that a sample be taken, I dilute it with 30% its weight of low-boiling solvent, such as petroleum naphtha, or aromatic solvent naphtha. This solution is then drowned with 20% its weight of 2% hydrochloric acid solution in water, in order to stop the polymerizing reaction, and to dissolve out the aluminum chloride. In this first wash, the small proportion of acid serves to prevent hydrolysis of the aluminum chloride catalyst. The mixture is allowed to settle, and the water layer is drawn off. I then wash with pure water, draw off the water layer from the reacted material, and distill the separated reacted material, with steam to a stage at which the residuum has a melting point of 100° C. (ball and ring method). When distilled to such stage, the yield, excluding the solvent, is approximately as follows:

| | Per cent |
|---|---|
| Unreacted turpentine constituents | 15 |
| Residual resin having a melting point of 100° C. | 45 |
| Dimers | 35 |
| Trimers | 5 |

From the fractionation of a sample so taken, it will be observed that the polymerizing reaction continued to a point at which all the polymerizable unsaturates have been polymerized, but discontinued at that point, gives a relatively high proportion of terpene dimers. Because of the high concentration of the starting material, and the controlled low temperature at which the batch is maintained during polymerization, there is also a fair yield of solid resin having a high melting point. This solid resin, as so recovered, has a color depth of less than a color 1 on the paracoumarone resin color scale.

I have discovered that it is possible, in a polymerization process employing the initial conditions above described, greatly to increase the proportion of solid terpene resin which is produced, and correspondingly to decrease the proportion of terpene dimers. In order to effect this further polymerization, the circulation of brine was stopped near the end of the first stage, and the working material was allowed to rise in temperature as the exothermic polymerization reaction continued. Before the temperature of the batch had reached 55° C., brine, in a lesser volume than employed in the preliminary polymerization stage, was again circulated through the cooling channels of the polymerizing vessel. The temperature rise was thus retarded, and the temperature was not allowed to reach a point substantially higher than 100° C. For a period of about 1½ hours, during the major proportion of which the temperature of the batch was in the neighborhood of 85° C., agitation of the mixture was continued without adding any additional catalyst, and at the end of such time, maximum polymerization, under the conditions of the process, had been obtained. At this point the entire batch was diluted with 300 parts by weight of mineral spirits, and was then washed in 260 parts by weight of 2% hydrochloric acid water solution. The solution of aluminum chloride in the very dilute hydrochloric acid was allowed to separate as a water layer and was run off. An adidtional wash with pure water was given, and when separation occurred, this also was removed.

The reacted mixture, after washing, was transferred to a still, and I distilled off the diluent added for washing, and the unreacted content of the starting material. The solvent was distilled off without continuing distillation at the stage of removing dimers and trimers. The products of this distillation were approximately as follows:

| | Parts |
|---|---|
| Added solvent | 300 |
| Unreacted turpentine constituents | 150 |
| Terpene resin, having a melting point as high as 65° C. (ball and ring method) | 805 |

This left 45 parts by weight of the starting material unaccounted for, and such loss apparently occurs by emulsification in washing the reacted material. The solid terpene resin thus represents (allowing for the loss in washing) about 100% of the polymerizable unsaturates in the starting material. The resin was less than color 1 on the paracoumarone resin color scale, and was not perceptibly darker than a resin taken before the secondary stage of the polymerizing reaction. In comparison with rosin, it may be said that the color of the resin is approximately that of a WW rosin, and its melting point is several degrees higher than the melting point of rosin.

Example No. 2

The polymerization procedure, and the procedure in washing and recovering the polymerized material, was identical with that of Example No. 1, up to the stage of distillation. In distilling, however, distillation was conducted with steam and vacuum for the removal of terpene dimers and trimers, leaving only high melting resin as the residue of distillation. Distilling to such stage, the products of distillation were approximately as follows:

| | Parts by weight |
|---|---|
| Unreacted turpentine constituents | 150 |
| Resin, having a melting point as high as 100° C | 635 |
| Terpene dimers | 175 |
| Terpene trimers | 40 |

The color of the solid resin was identical with the color of the solid resin obtained in Example No. 1. I have found that in the absence of an alkaline wash, and the reacted material having a hydrogen ion concentration below 7, the still temperature may be as high as 250° C. without causing the resin to darken.

Experimentally, I have used alkaline neutralizing reagents, and have found that in distilling with most of them to a stage at which dimers and trimers are removed, the residual solid resin has about a color 2 on the coal tar resin color scale; that is, it is approximately equivalent in coloration to an M resin. If it should for any reason be desired wholly to neutralize with an alkaline reagent, I have discovered that ammonium hydroxide should be used, if the metallic halide catalyst be a chloride. This is for the reason that in such case the ammonium chloride formed by reaction, has a hydrogen ion concentration below 7, and is volatile under steam distillation. In the absence of neutralization, however, the resin has an acid number of only a few points, its acidity being negligible.

The resins obtained by the procedures of both Example No. 1 and Example No. 2, under test showed about 1/20 the yellowing tendency of paracoumarone resin, and about 1/2 the yellowing tendency of ester gum.

Example No. 3

The procedure in this example was identical with that of Example No. 1 up to the stage in which the starting material had been polymerized, the polymerized material had been washed with hydrochloric acid and with water, and the successive water layers formed by separation after these washings had been removed. At that stage I then further treated the polymerized material by transferring the solution of polymers in the mineral spirits, amounting to about 1250 parts by weight after washing, to a heating vessel. I then added about 400 parts by weight of an efficient bleaching clay of the sort which consists of a bentonite clay activated by acid treatment. The solution of terpene polymers was agitated with the clay at a temperature of about 120° C. for approximately 1/2 hour, and the mixture was then filtered. The filtrate was practically as colorless as water. The filtrate was then distilled in accordance with the procedure of Example No. 1. If the clay and the polymerized material be both wholly dry, temperatures below an elevation of 100° C. are adequate in heating together the polymerized material and the bleaching clay.

Bearing in mind that in Example No. 1 the total theoretical content of polymerizable unsaturates in the starting material were brought into the form of polymers, it will be understood that by discontinuing distillation at such stage that dimers and trimers are not carried off, the total weight of solid resin cannot be other than that obtained by the procedure of Example No. 1. There had, however, been a further polymerization effected by treatment with bleaching clay, and this further polymerization was evidenced by an increase in melting point from about 65° C. (ball and ring), as in Example No. 1, to a melting point of about 74° C. (ball and ring).

The resin possessed a coloration so negligible that it could not be given even a fractional color number of recognized value on the paracoumarone resin color scale. Its color can be defined by saying that it is approximately as light as the color of pure unmodified glycerol phthalate condensation product. It is lighter in color than any known unmodified ester gum, resin, paracoumarone resin, or petroleum resin. The resin has great color stability under heat, sunshine, or the ultra-violet ray, and it may be considered to be in practical effect a non-yellowing resin.

Example No. 4

The procedure of this example was identical with that of Example No. 3 up to the stage of distillation. Distillation was, however, continued to a stage at which terpene dimers, as well as added solvent and the non-reactive and naturally associated solvent content of turpentine, were distilled off. The results of distillation were approximately as follows:

| | Parts by weight |
|---|---|
| Added solvent | 300 |
| Unreacted turpentine constituents | 150 |
| Terpene resin having a melting point as high as 100° C. (ball and ring) | 740 |
| Terpene dimers | 110 |

The solid, high-melting, resin was identical in color, and in non-yellowing characteristics, with the lower-melting solid resin recovered in Example No. 3. Considering the yield above given, it will be noted that more than 80% of the initial polymerizable content of the turpentine is, in this example, recovered as terpene resin having a melting point as high as 100° C.

In the examples, aluminum chloride has been given specifically as the catalyst employed. Taking the metallic halide catalyst aluminum chloride as standard, I have found that the best results are obtained when it is used in a quantity of one pound of catalyst to from 15 to 20 pounds of the unsaturated carbocyclic terpene hydrocarbons constituting the starting material. Increasing the quantity of this catalyst beyond a proportion of 1 pound of catalyst to each 15 pounds of the reactives, does not apparently increase the reaction value of the polymerization reaction and lead to an increased polymerizing effect. In substituting other metallic halide catalysts for the aluminum chloride, the optimum proportion of catalyst to starting material is desirably increased or decreased from the 1:15 ratio preferred in the case of aluminum chloride in proportion as the molecular weight of the catalyst is greater or less than that of aluminum chloride.

It will be seen from the foregoing examples and discussions, that my invention primarily proceeds from the discovery that in the polymerization of the polymerizable unsaturates of turpentine advantage may be taken of the qualities in which the metallic halide catalysts differ from other catalysts usable to effect such polymerization; and in the corollary discovery that the metallic halide catalyst might be removed from the reacted material without hydrolysis in the absence of an alkaline neutralizer. Thus, having discovered that reasonably high temperature in the reaction body works no substantial detriment to the color of the product resin, I make each polymerization include two stages, or periods, of specifically different sort and effect. By strictly limiting the temperature in the first reaction stage, I operate during that stage under a condition favoring the initial formation of high polymers. By permitting the temperature of the reaction body to rise in the second stage, after all the catalyst has been added, I create a condition favorable to a polymerizing reaction between low polymers which have been formed in the first stage. In the third stage of the polymerization, if such stage be included, I give an additional polymerizing reaction to remaining low polymers, by introducing a catalyst of different type than the metallic halide by which the main polymerization has been promoted.

In both the primary and secondary polymerization stages, increased tendency to form high polymers is normally obtained with increased concentration of reactives in the starting material. It is for this reason, even more than to avoid retarding polymerization, that I prefer to polymerize in a starting material, such as turpentine, without the addition of diluent. In this connection, it may be noted that I have observed no substantial increase in reaction value, and difference in result from concentrating further the polymerization reactives of turpentine by decreasing its content of naturally associated solvent. The starting material of the examples given above contains only about 15% of such solvent, but I have found that it may be present in a slightly greater proportion without disadvantage other than in limiting the effective resin-producing capacity of the polymerizing vessel.

Under certain circumstances it may be desirable within limits to dilute the starting material by addition of inert hydrocarbon solvent of either aliphatic or aromatic sort. If, for example, polymerization be conducted in a polymerizing vessel the cooling system of which is inefficient, it may be desirable restrictedly to dilute down to, but not below, a point at which the lower temperature thus rendered possible, by its tendency toward high polymer formation more than compensates for the counter tendency to low polymer formation given by the decreased concentration of the reactives. In no instance have I found it useful to dilute the starting material below a 50% concentration of the reactive unsaturates, as the reaction value is in such case so reduced that a tendency for the formation of dimers preponderates. It should be noted that the solvent added in the examples given above is added to dilute the reacted material after polymerization, or for the tertiary stage in which the product of the primary and secondary polymerization stages is treated with bleaching clay. In no example is it added before, or during, either the primary or secondary reaction stage.

In preparation for polymerization, it may be desirable to purify the starting material if it has stood for a long time. This because aging tends to cause the presence of oxides, peroxides, aldehydes, and hydroxy compounds, which tend to inhibit polymerization. They may readily be removed by distillation, or by a light alkaline wash, since a slight alkalinity at that time does not result in a discolored product.

As to the specific ranges of temperature in which I prefer to polymerize during the respective primary and secondary stages of the polymerization reaction, I hold the reaction temperature below 50° C., and at an optimum no higher than about 35° C., until approximately all the reactive unsaturates have been brought to at least the condition of dimers. In the secondary stage the temperature should exceed 55° C., and I have found that, in the preferred high concentration of the reactives, it is desirable that the working temperature should not greatly exceed a temperature of 100° C., as at temperatures above 100° C., injury to the color of the resin is frequently caused.

My resin is wholly hydrocarbon in nature, consisting as it does throughout of polymers in accordance with the general formula $(C_{10}H_{16})_x$. In my resin there is no modification by the inclusion of other chemical structures, and insofar as I have been able to observe the several specific substances constituting the polymerizable constituents of turpentine produce resin which is in its inherent characteristics uniform, without there being any requisite change in the structural arrangement of the unit molecules included in the resin polymers.

I claim as my invention:

1. The method of producing solid terpene resin from turpentine containing at least 85% of polymerizable terpene unsaturates, which comprises: bringing the turpentine into reactive contact with a Friedel-Crafts metallic halide polymerization catalyst added in increments while maintaining the temperature of the reaction mass below 35° C. during the primary polymerization stage, and after all of said catalyst has been added, effecting further polymerization in a secondary stage at temperature range exceeding 55° C. and not substantially exceeding 100° C.; the primary stage temperature below 35° C. being maintained over a period of time sufficient to polymerize substantially all of the original polymerizable unsaturates present, yet yielding in a sample fractionated at the completion of the primary stage 45% of residual resin having a melting point of 100° C., 35% of dimers and 5% of trimers.

2. The method of claim 1, including the additional step of diluting the reaction mass from the secondary stage with an inert solvent for the terpene polymers and agitating the solution at moderate temperatures with an activated bleaching clay, to supplement the polymerization effect promoted by the catalyst initially employed and to obtain an attendant bleaching of the dissolved terpene polymers.

3. The method of producing solid terpene resin from turpentine containing at least 85% of polymerizable terpene unsaturates, which comprises effecting a primary polymerization by bringing the turpentine into reactive contact with a Friedel-Crafts metallic halide polymerization catalyst at a temperature range maintained below 35° C. and for a period of time sufficient to polymerize substantially all of the original polymerizable unsaturates present, and yielding in a sample fractionated at that stage 45% of residual resin having a melting point of 100° C., 35% of dimers and 5% of trimers; thereafter, permitting the temperature to rise above 55° C. but not substantially above 100° C. and maintaining such temperature range for a substantial period to effect further polymerization of constituents contained in the primary polymerizate, the temperature of the reaction medium being held at about 85° C. during a major portion of the subsequent polymerization step.

WILLIAM H. CARMODY.